United States Patent [19]
Simcoe

[11] 3,781,654
[45] Dec. 25, 1973

[54] SWITCHING VOLTAGE REGULATOR CIRCUIT

[75] Inventor: Kent W. Simcoe, Loveland, Colo.

[73] Assignee: Hewlett-Packard Company, Palo Alto, Calif.

[22] Filed: May 26, 1972

[21] Appl. No.: 257,264

[52] U.S. Cl.............. 323/17, 323/22 T, 323/DIG. 1
[51] Int. Cl................................................ G05f 1/56
[58] Field of Search................ 321/2; 323/17, 22 T, 323/38, DIG. 1

[56] References Cited
UNITED STATES PATENTS

| | | | |
|---|---|---|---|
| 3,417,321 | 12/1968 | Clapp | 323/DIG. 1 |
| 3,093,790 | 6/1963 | Ehret | 323/DIG. 1 |
| 3,378,758 | 4/1968 | Goodenow | 323/DIG. 1 |
| 3,328,674 | 6/1967 | Bleicher | 323/DIG. 1 |

FOREIGN PATENTS OR APPLICATIONS

| | | | |
|---|---|---|---|
| 1,939,459 | 2/1970 | Germany | 323/DIG. 1 |

*Primary Examiner*—A. D. Pellinen
*Attorney*—Roland I. Griffin

[57] ABSTRACT

A tapped inductor is utilized in a switching mode voltage regulator, which employs a pass transistor and an associated driver transistor connected in a modified Darlington configuration, for the purpose of allowing these transistors to saturate during switching, thereby substantially increasing the over-all efficiency of the regulator. A filter circuit may be added at the output of the voltage regulator to significantly reduce ripple and to improve the response of the regulator to load transients.

3 Claims, 3 Drawing Figures

PATENTED DEC 25 1973  3,781,654

SWITCHING VOLTAGE REGULATOR CIRCUIT

BACKGROUND AND SUMMARY OF THE INVENTION

This invention relates generally to switching regulator power supply circuits. Such circuits constructed according to the prior art have been characteristically inefficient because of high conduction losses or high drive power requirements associated with their switching transistors. In addition, these circuits have required large numbers of components for fabricating the timing and modulator portions thereof.

A more recent development has been the use of linear amplifiers in self-timing and self-modulating switching regulator circuits, thus permitting a significant reduction in component count. In order for these circuits to operate properly, a significant amount of ripple is required on the feedback signal, which in turn has meant high ripple content at the output, thus preventing their use in a number of critical applications. Also, the transient response of these circuits to load fluctuations is poor because of low output capacitance. This situation exists because the output capacitance typically forms a portion of the timing circuitry. It would be desirable to provide a circuit having timing circuitry which is independent of output capacitance.

Accordingly, it is the principal object of this invention to provide an improved switching regulator power supply circuit utilizing a minimum number of components and having high over-all efficiency.

It is a further object of this invention to provide an improved switching regulator power supply circuit which exhibits low ripple content at its output.

It is a further object of this invention to provide an improved switching regulator power supply circuit which has a better transient response to load variations than those circuits constructed according to the prior art.

DESCRIPTION OF THE PREFERRED EMBODIMENT

Figure 1:
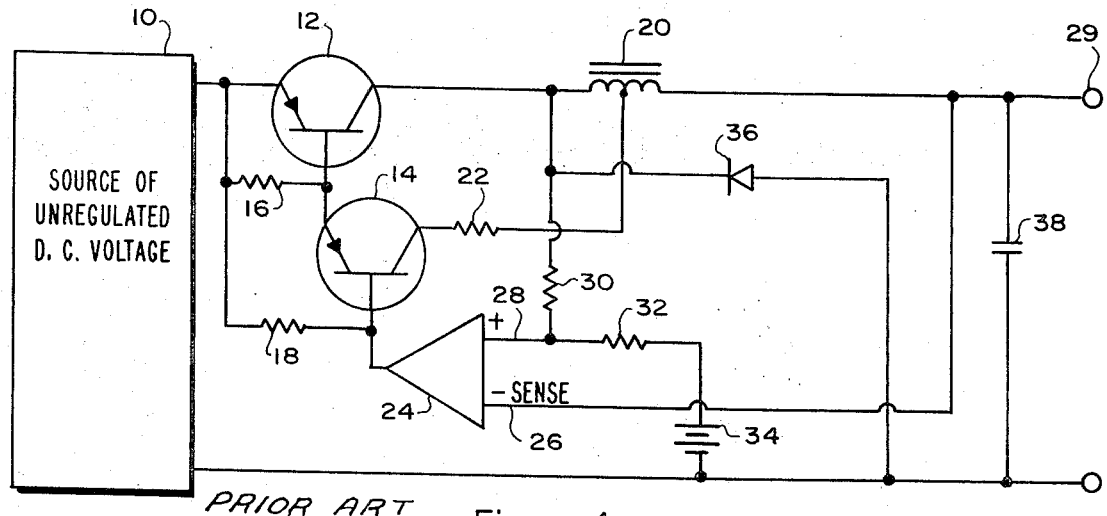
FIG. 1 is a detailed schematic diagram of a switching regulator circuit.

Referring to FIG. 1, there is shown a prior art switching regulator circuit including a source of unregulated D.C. voltage 10 connected to the input of a switching voltage regulator circuit. Such a source of input voltage may comprise, for example, a conventional 60-hertz transformer, a bridge rectifier, and a simple capacitive filter. A switching transistor 12 and an associated driver transistor 14 are connected as a modified Darlington pair with resistors 16 and 18 interposed between the respective bases thereof and the source of unregulated voltage to provide a discharge path for the bases. The emitter of switching transistor 12 is also returned to the source of unregulated voltage 10. The collector of transistor 12 is connected serially with an iron core inductor 20 to an output terminal 29. The collector of transistor 14 is returned to a tap on inductor 20 through a resistor 22. This tap is positioned for providing sufficient voltage to saturate transistors 12 and 14 during switching, thereby significantly reducing the conduction losses therein. Tapped inductor 20 could be replaced with a resistor for generating this required voltage, but such an arrangement would result in the disadvantage of sizeable additional power losses. Resistor 22 is interposed between the tapped inductor 20 and the collector of transistor 14 to limit the maximum base current to transistor 12. Power dissipation in resistor 22 may be minimized by positioning the tap on inductor 20 consistent with transistor parameters and circuit requirements. A linear differential amplifier 24 is employed to provide base drive for transistor 14. Such an amplifier might comprise, for example, a Fairchild 723 integrated circuit operational amplifier, available as an off-the-shelf component. An inverting input 26 of amplifier 24 is connected to the point at which it is desired to sense the output of the voltage regulator. A non-inverting input 28 is connected through a resistor 30 to the collector of transistor 12 and through another resistor 32 to a source of reference voltage 34. These resistors provide sufficient hysteresis to insure reliable switching, thus stabilizing the switching frequency and, hence, the switching losses. A diode 36 serves to clamp the input of inductor 20 to ground potential when transistors 12 and 14 are switched off. A capacitor 38 is provided at the output of the voltage regulator for ripple reduction.

Since hysteresis has been added to the circuit, a significant ripple signal at the switching frequency must be present on the feedback sense signal to amplifier 24. This requirement limits the amount of capacitance that can appear at the output of inductor 20, thus limiting the size of capacitor 38 and, hence, the purity of the regulator output and the transient response of the regulator circuit.

Figure 2:
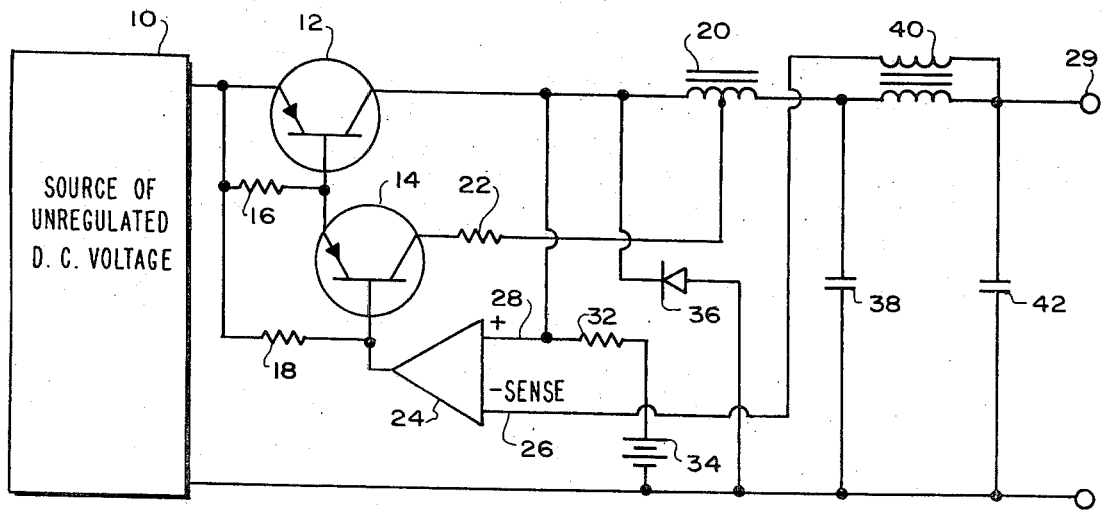
FIG. 2 is a detailed schematic diagram of a switching regulator circuit incorporating a filter for isolation of an output sense point according to the preferred embodiment of this invention.

Referring now to FIG. 2, there is shown the prior art circuit of FIG. 1 with the addition of a filter for isolating the output sense point from the remaining circuitry in accordance with the preferred embodiment of this invention. By providing such isolation, an output capacitor 42 may be made very large, thus significantly reducing the ripple content of the regulated output voltage and improving the response to load transients. The filter comprises a transformer 40 having a first winding connected between the output of inductor 20 and the output terminal 29 of the voltage regulator. A second winding of the transformer is connected between the inverting input 26 of amplifier 24 and the point at which it is desired to sense the D.C. output of the voltage regulator. The necessary ripple signal is thereby added to the D.C. sense signal by the second winding to insure proper operation of the circuit.

Figure 3:
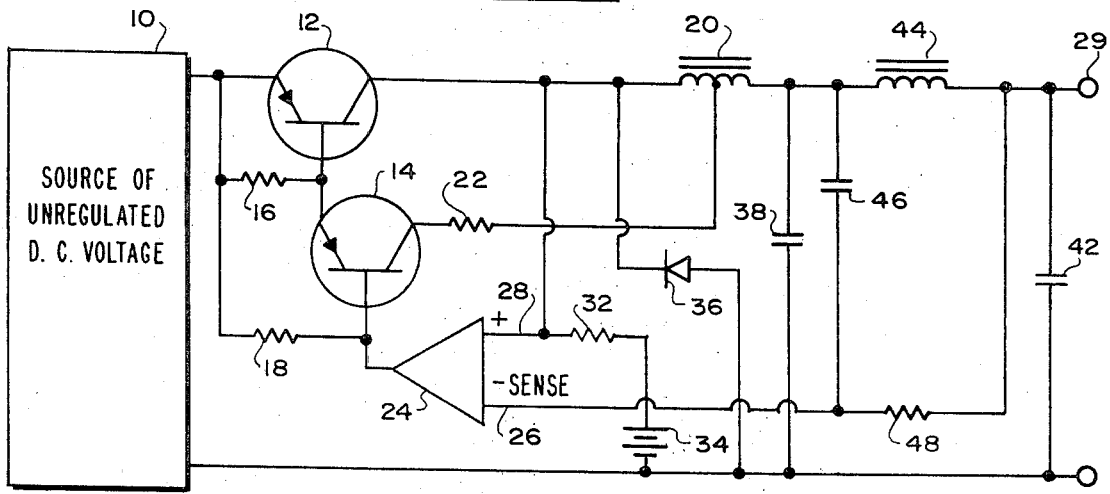
FIG. 3 is a detailed schematic diagram of a switching regulator circuit utilizing an alternate configuration for the filter contained in the circuit of FIG. 2.

Referring to FIG. 3, there is shown the circuit of FIG. 2 in which an alternate configuration for the output filter has been implemented. Transformer 40 in FIG. 2 may be replaced by an iron core inductor 44 in FIG. 3. A capacitor 46 and a resistor 48 are provided to couple the total feedback signal comprising (1) the ripple signal appearing at the output of inductor 20 and (2) the D.C. sense signal taken from the output of the voltage regulator to the inverting input 26 of amplifier 24.

I claim:

1. An improved switching circuit for deriving a regulated D.C. voltage from a source of unregulated D.C.

voltage, said switching circuit being of the type having at least a switching transistor, an associated driver transistor, a linear differential amplifier with an inverting input for sensing the output voltage at an output of the switching circuit, with a non-inverting input for sensing a source of reference potential, and with an output for driving the switching and driver transistors, and a tapped inductor connected between the collector of the switching transistor and the output of the switching circuit, wherein the improvement comprises a transformer having a first winding connected between the tapped inductor and the output of the switching circuit and a second winding connected between the output of the switching circuit and the inverting input of the linear differential amplifier.

2. An improved switching circuit for deriving a regulated D.C. voltage from a source of unregulated D.C. voltage, said switching circuit being of the type havng at least a switching transistor, an associated driver transistor, a linear differential amplifier with an inverting input for sensing the output signal at an output of the switching circuit, with a non-inverting input for sensing a source of reference potential, and with an output for driving the switching and driver transistors, and a tapped inductor connected between the collector of the switching transistor and the output of the switching circuit, wherein the improvement comprises a filter inductor interposed between the tapped inductor and the output of the switching circuit and associated means for coupling a feedback signal comprising both a ripple signal appearing at the point of connection of the tapped inductor and the filter inductor and a D.C. sense signal taken from the output of the switching circuit to the inverting input of the linear differential amplifier.

3. An improved switching circuit for deriving a regulated D.C. voltage from a source of unregulated D.C. voltage, said circuit being of the type having at least a switching transistor, an associated driver transistor, and a linear differential amplifier with an inverting input for sensing the output voltage at an output of the switching circuit, with a non-inverting input for sensing a source of reference potential, and with an output for driving the switching and driver transistors, wherein the improvement comprises a transformer having a first winding serially connected in an output lead of the switching circuit and a second winding connected between the output of the switching circuit and the inverting input of the linear differential amplifier.

* * * * *